United States Patent [19]

Craven

[11] 3,953,960

[45] May 4, 1976

[54] FRUIT PICKING APPARATUS

[76] Inventor: William E. Craven, Rte. 6, Laurel, Miss. 39440

[22] Filed: Aug. 9, 1974

[21] Appl. No.: 496,302

[52] U.S. Cl. ............................................. 56/328 R
[51] Int. Cl.². ........................................ A01D 46/24
[58] Field of Search ............. 56/328 R, 327 R, 332, 56/33, 34, 35; 198/211

[56] References Cited
UNITED STATES PATENTS

| | | | |
|---|---|---|---|
| 2,616,236 | 11/1952 | Hartley | 56/34 |
| 2,715,809 | 8/1955 | Buell | 56/28 |
| 3,138,912 | 6/1964 | Mays et al. | 56/328 R |
| 3,530,654 | 9/1970 | Staats, Sr. et al. | 56/328 R |
| 3,613,868 | 10/1971 | Rickerd | 198/211 |

*Primary Examiner*—Russell R. Kinsey
*Attorney, Agent, or Firm*—Lowe, King, Price & Markva

[57] ABSTRACT

An apparatus for removing fruit, particularly citrus fruit, from a tree comprises a composite picker roll containing a plurality of axially spaced apart segment wheels. Each segment wheel has a plurality of resilient, arcuate pressure members for engaging the fruit being picked. The roll is mounted within a housing and coupled to a hydraulic motor for rotation. A plurality of free floating fingers, resiliently mounted to the housing, is positioned parallel to the roll and in juxtaposition to each other. The fingers are aligned one-to-one below the roll segment wheels and are spaced apart therefrom to form channels through which fruit is conveyed. During picking, the resilient pressure members of the roller segment wheels, cooperating with the free floating, resilient fingers, provide multiplanar rotation of the fruit to efficiently snap the fruit from the tree branch without tearing the skin of the fruit and without breaking the branches or disturbing delicate blossoms on the branches. Then the picked fruit is gently rolled along the channels to a canvas transfer bag for subsequent deposit into a receptacle. The gentle rolling of the fruit between adjacent pairs of fingers and roll segments distributes the picking forces at four points and thus prevents bruising the fruit; and, due to the resiliency of the fingers and segments, the size of the channels automatically adjusts to a range of sizes of fruit. The size of the channels is roughly adjustable by the operator by means of the adjustable springs and guide rods supporting the fingers. An idler roller mounted to the housing below the fingers further protects the branches and the delicate blossoms of the tree from being damaged by the rotating roll during harvesting.

10 Claims, 8 Drawing Figures

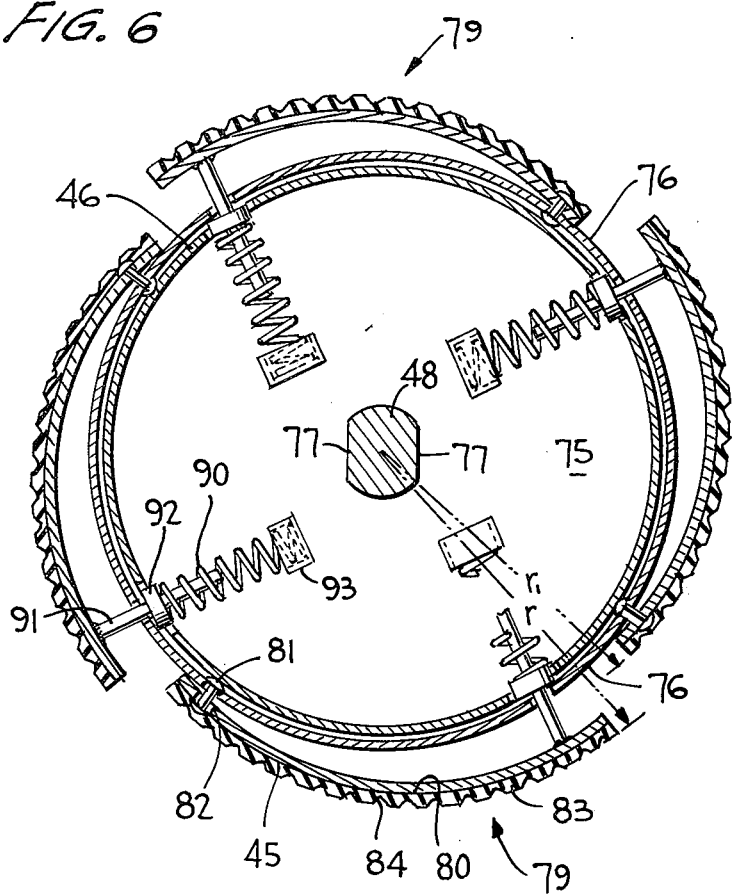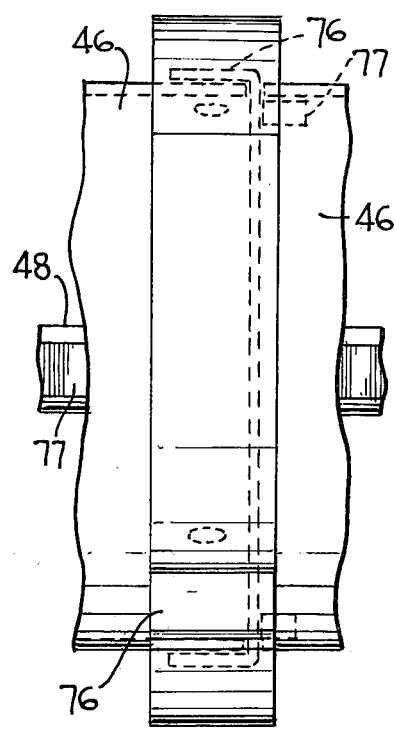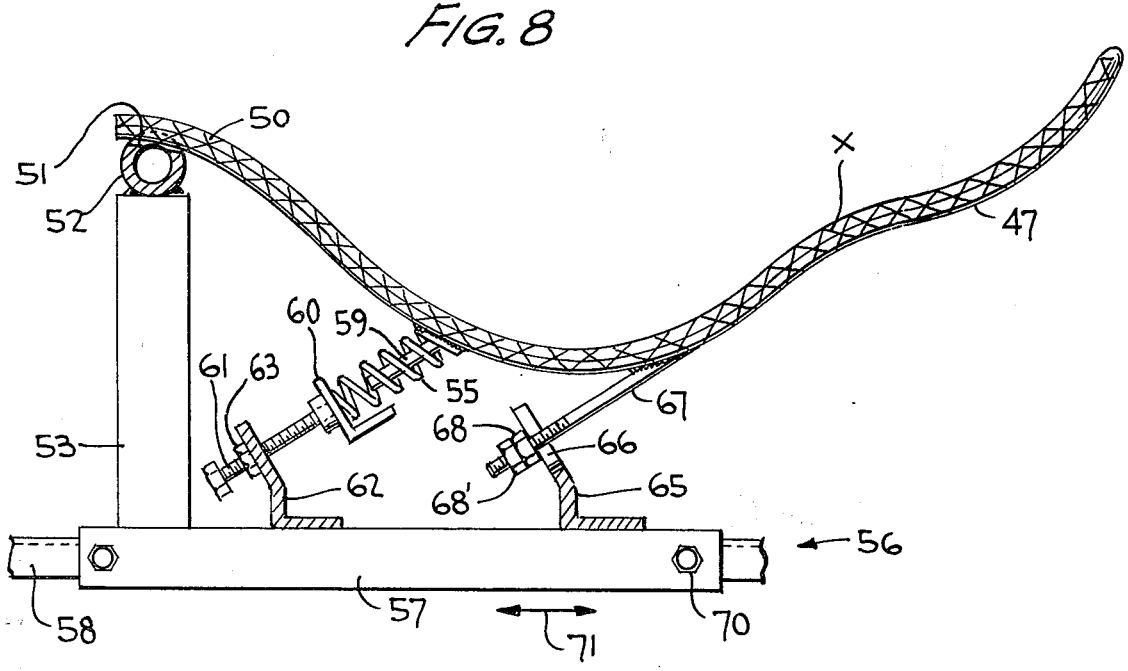

FRUIT PICKING APPARATUS

FIELD OF THE INVENTION

The present invention relates generally to fruit picking apparatus and, more particularly, to an apparatus which snaps fruit from a tree without damage by causing a multiplanar rotation of the fruit.

BACKGROUND OF THE INVENTION

In the harvesting of fruit, and particularly citrus fruit such as oranges, automated harvesting equipment has made dramatic strides forward in the last few years. However, there have been some misgivings of previous devices due to a tendency to harm the fruit by tearing or bruising the skin. That is, in order to remove a piece of citrus fruit from the tree without ruining the fruit, it is a prerequisite that the fruit be grasped by the mechanical picker without penetrating the skin. If the skin is broken, or even bruised, especially in the area around the stem, the fruit rapidly deteriorates and spoils by the time it reaches the market.

One method of manually picking fruit from the tree is for the picker to simultaneously apply an outward pulling force and bending action to the stem of the fruit. Mechanical harvesting equipment used heretofore has tried to emulate this technique. While this prior equipment performs generally satisfactorily, some tearing and bruising of the fruit occurs during picking and conveying.

I have found that an improved picking operation is provided when, in addition to simultaneously pulling and bending the stem of the fruit, the fruit is also slightly twisted about the stem. When these three forces are simultaneously applied, I have found that the stem snaps more easily and cleanly from the surface of the fruit, thus minimizing the chances of the mechanical picker damaging the skin. The pulling, bending and twisting of the fruit must be performed firmly to effect the separation, yet gently to avoid bruising the skin.

Prior harvesting equipment, although capable of picking large quantities of fruit from a tree, insofar as I am aware, does not provide the simultaneous actions of pulling, bending and twisting which I have found to be desirable for cleanly separating the fruit from the stem. For example, in the U.S. Pat. to Swift, No. 3,552,107, there is shown one apparatus containing a plurality of fingers which are caused to bodily rotate on a housing. A portion of the fingers extends outside the housing during rotation for engaging the hanging fruit. The rigid, bodily rotating fingers produce pulling forces to the fruit to remove the fruit from the tree. There is substantially no simultaneous bending of the stem. It is clear no twisting action of the fruit during picking is contemplated. Thus some tearing of the fruit, particularly adjacent the stem, may be observed. In addition, the rigid fingers bumping into the fruit during rotation, rather than a gentle cradling action, can be responsible for bruising and occasionally even cutting into the skin.

Another difficulty found using prior art harvesting equipment is that branches of the tree tend to become entangled with the fruit picking mechanism. This entanglement ruins the limbs and the fruit bearing blossoms of the tree, interferes with the fruit picking process by creating down time, and occasionally even damages the fruit picking mechanism.

OBJECTIVES OF THE INVENTION

Accordingly, it is one object of the present invention to provide a new and improved fruit picking apparatus overcoming the disadvantages outlined above.

It is another object of the present invention to provide a fruit picking apparatus which effects simultaneous pulling, and multiplanar twisting forces to the fruit to more easily and cleanly snap the fruit from the stem.

It is still another more particular object of the present invention to provide a fruit picking apparatus which more efficiently snaps fruit from the tree without tearing or bruising the fruit by (1) pulling the fruit, (2) bending the stem, and (3) twisting the fruit about its normal center axis.

It is yet another object of the present invention to provide a fruit picking apparatus which does not damage the fruit bearing limbs of the tree during removal of the fruit.

It is yet another object of the present invention to provide a fruit picking apparatus having a plurality of roller segments and corresponding free floating fingers which cooperate to pick several pieces of fruit simultaneously from the tree.

It is a further object of the present invention to provide a fruit picking apparatus which is simple in construction and easy to operate and maintain.

BRIEF DESCRIPTION OF THE PREFERRED EMBODIMENT

The fruit picking apparatus of the present invention comprises a picker roll mounted on a shaft in a housing, and formed of a plurality of axially spaced apart resilient segment wheels. The roll is coupled through its shaft to a suitable driving motor, such as a hydraulic motor, for rotation.

A plurality of resiliently mounted, free floating fingers are positioned parallel and in juxtaposition to each other. The fingers are separated from the resilient segment wheels of the roll to form channels of a size sufficient to permit the passage of fruit therethrough. The resilient interaction of resilient pressure members on the wheels with the free floating fingers contributes to the gentle handling characteristic afforded the picker head of the present invention. In the preferred embodiment, the pressure members comprise a plurality of arcuate plates spring loaded toward the fingers. In addition, the members have resilient fruit-engaging surfaces. The segment wheels and fingers are located in one-to-one alignment and the space between adjacent wheel-finger pairs forms the channel gently grasping the spherical fruit at four spaced pressure points.

In operation, the fingers gently engage the fruit as the picker head moves like a comb up through the outer reaches of the branches of the tree. The fruit will first engage one roll segment wheel and finger pair and start to rotate. The fruit is pulled. The stem starts to bend due to rotation about a lateral axis perpendicular to the center or stem axis. Immediately the fruit also is twisted about the stem axis as it rolls down and seeks the four-point engaging position in the channel between the two adjacent segment wheels and finger pairs. After full four point engagement, this important twisting action may be continued briefly by the slight differential frictional forces and surface rotational speeds between the adjacent pairs until the fruit snaps clean from the stem.

The fingers are supported in the housing by a gang of adjustable springs. By adjusting the tension in the springs and a stop on a guide rod attached to the bottom of each finger, the spacing between the fingers and the roll segments may be manually adjusted by the operator according to the size of the fruit to be picked. During maintenance of the picker head, the fingers are easily removed by simply removing the stop nut from the guide rod and lifting the finger and spring free. This is possible since, according to the invention, the fingers are freely floating with only a bearing notch providing the rear pivot point in a downward direction.

An idler roller mounted forward of the housing serves to prevent entanglement of branches of the tree in the segment wheels. The roller effectively blocks the entrance of heavily fruit laden, substantially vertically oriented branches. The roller also assists in flipping out any horizontally or upwardly extending branches which enter the housing.

A canvas transfer bag fastened between the housing and a receptacle on the vehicle routes the fruit to the receptacle without requiring a separate dump procedure. The bag serves as an intermediate storage container for the fruit. As the operating boom reaches the top of the tree on each vertical picking sweep, the bag is stretched out allowing the fruit just picked to roll as a batch into the container. By thus breaking the total downward movement of the fruit into two smaller portions, and using the fruit of each batch to cushion itself as it enters the container, the efficiency of the picking operation is further enhanced.

The fruit is protected during the multiplanar rotation not only by the spring loading of the fingers, but also by the spring loading of the arcuate pressure members on the picker roll segment wheels. As stated, the pressure members are covered with grooved resilient surface material, to not only protect, but to give firm traction on the fruit.

In the overall operation, the picking head, connected to an elevator boom, usually on a vehicle, is initially positioned in proximity to the tree at the bottom thereof and the operator advances the head into the fruit bearing branches of the tree. The operator then finely positions the head by three-dimensional motion to cause the fingers of the head to intercept fruit. As the fruit enters the channels between the segment wheels and the fingers, the rotation of the roll draws the fruit further into the channel creating simultaneous pulling and bending action to the fruit. In addition, during seating of the fruit in the channels, an additional twisting action to the fruit is created and the fruit is cleanly snapped from the stem on the limb of the tree. This multiplanar action produces a clean separation without rupturing the skin. The fruit is then gently conveyed by the roller through the throat of the channel and is transferred to the attached canvas bag.

The combined action of pulling, bending and twisting the fruit followed by the gentle conveying of the fruit prevents rupturing of the skin of the orange during picking, and prevents bruising of the fruit by unwanted collision with the machine parts.

The spring mounted fingers and resiliently biased pressure members permit the apparatus to harvest spherical type fruits of the same nominal size without adjustment of the machine parts. When adjustment for larger or smaller nominal sizes is required, for example, when converting between the harvesting of oranges and grapefruits, the operator can easily perform the adjustments on the gang mounted springs and the guide rods.

Still other objects and advantages of the present invention will become readily apparent to those skilled in this art from the following detailed description, wherein I have shown and described only the preferred embodiments of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 6 is an enlarged partial sectional view of the picker head illustrating one embodiment of the roll taken through a segment wheel along a line parallel to line 3—3 of FIG. 2, said wheel having outwardly extending spring biased arcuate members;

FIG. 7 is a front view of one roll segment of FIG. 6; and

FIG. 8 is an enlarged partial sectional view of one side of the carriage and a picker finger including the adjusting spring and the guide rod, the view being taken generally along line 3—3 of FIG. 2.

DETAILED DESCRIPTION OF THE PREFERRED EMBODIMENT

Figure 1:
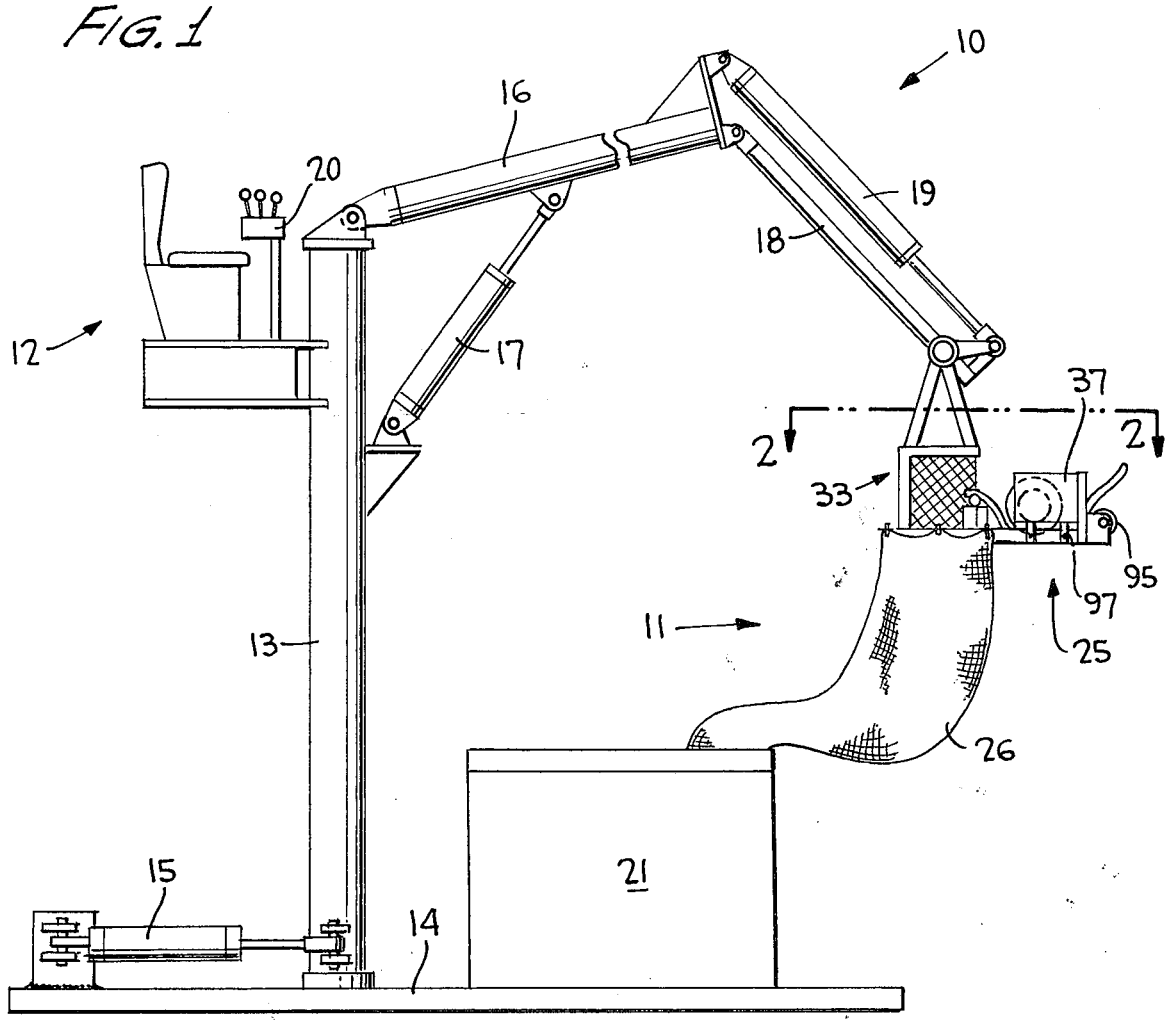
FIG. 1 is a side view of the complete fruit picking apparatus employing the picker head of the present invention.

With reference to FIG. 1, there is shown a fruit picking apparatus 10 having a picker assembly 11 constructed in accordance with the principles of the present invention. The apparatus 10 includes an operator's platform 12 positioned on an oscillatable support boom 13 mounted on a base 14. A hydraulic operator 15 serves to oscillate the boom 13 for movement of the entire apparatus 10 about a vertical axis.

A main support arm 16 is pivotally attached to the top of the boom 13 and is operated about a horizontal axis by hydraulic cylinder 17. A second or extension arm 18 supports the picker assembly 11 at the free end thereof. Hydraulic cylinder 19 serve to operate this arm 18. Hydraulic controls 20 are provided on the operator's platform 12 and it is to be understood that suitable hydraulic interconnections and hydraulic pump may be provided in a conventional manner. With this apparatus, the picker assembly 11 of the present invention is capable of being moved up through a fruit bearing tree to engage the fruit and pick it. The base 14 is normally mounted on a vehicle in order to facilitate the movement of the fruit picker apparatus 10 through a grove of trees.

The picker assembly 11 is capable of engaging and picking several pieces of fruit at one time. Normally, the operator starts at the bottom of the tree and moves the assembly 11 up along the outer branches of the tree, picking the fruit as the assembly combs through these branches. While the assembly 11 is adapted mainly for engagement with the outer branches where the largest fruit grows, some fruit on the inner branches can also be picked by careful and skillful manipulation of the controls 20 to move the picker assembly 11 through openings in the tree for engagement of the additional fruit. A container 21 is positioned on the base 14 to receive and store the fruit during the picking process. When this container is full, it is merely replaced with a like container and the picking process continues with minimum interruption.

The picker assembly 11 is basically a two-part device. A picker head 25 is the first part and it interacts with the fruit to remove the same from the tree. The second part or sub-assembly of the picker assembly 11 is a transfer bag 26 in which the fruit is deposited after it is freed from the tree. As will be seen later in detail, the bag 26 offers a temporary storage area for the picked fruit and also provides a two-stage transfer for the fruit so that the vertical drop at any one time is minimized.

With reference to FIGS. 2–5, a more detailed description of the picker head 25 can be given. The head 25 comprises a basic framework including tubular side rails 30 connected by suitable cross braces 31, 32 (see FIGS. 2–4). Adding stability to the framework and providing the attachment point for the picker head 25 is a cage 33. Bracket 34 on top of the cage serves as the pivotal attachment to the arm 18. The connection to the arm 18 may be provided with a suitable cable or gearing system (not shown) in order to manipulate the picker head 25 in the operating position shown. However, the weight of the bag 26 normally balances and holds the head 25 as shown (see FIG. 1).

Figure 5:
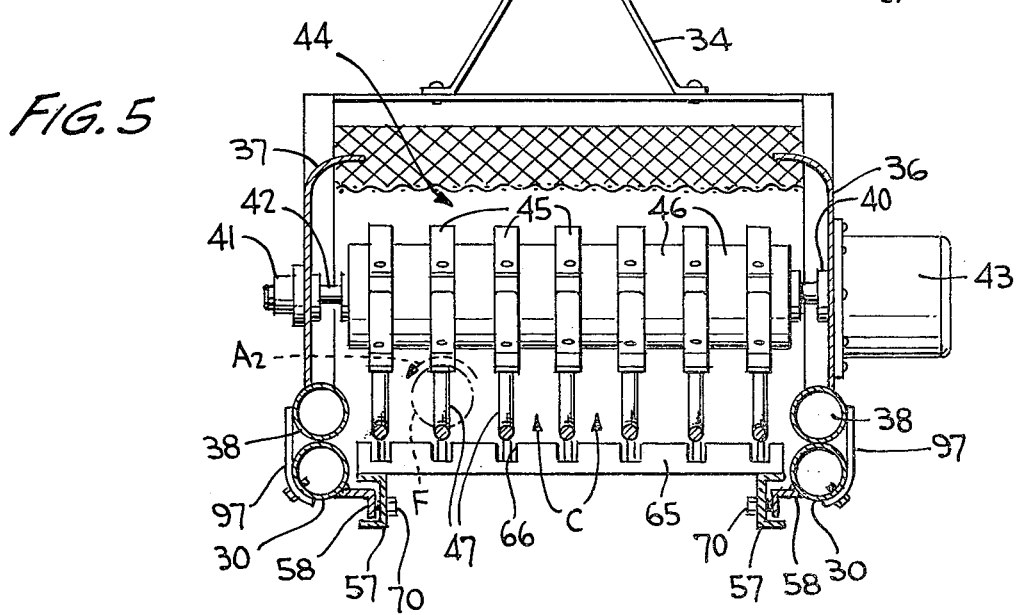
FIG. 5 is an enlarged sectional view of the fruit picker head viewed along the line 5—5 of FIG. 3.

Mounted forward on the head 25 is a pair of side walls 36, 37 that are attached to the side rails 30 by similar tubular base members 38 (see FIG. 5). Journaled in suitable bearings 40, 41 on the side walls 36, 37 is a drive shaft 42 which is driven by a suitable motor, such as a hydraulic motor 43. Mounted to the shaft for rotation upon actuation of the motor 43 is a composite picker roll, generally designated by the reference numeral 44. The picker roll includes a plurality of axially spaced segment wheels 45, as can best be seen in FIG. 5. The details of the segment wheels 45 will be explained hereinafter in detail. Suffice it to say that the wheels 45 are securely attached to the shaft 42 for rotation therewith and are kept equally spaced by suitable concentric spacers 46.

In accordance with an important aspect of the present invention, pivotally floating fingers 47 are aligned on a one-to-one basis with the segment wheels 45 so as to cooperate to form the gripping surfaces for the fruit picking operation. The fruit is picked, such as the fruit F shown in FIG. 3, by passing through channels C formed between the driving segment wheels 45 and the fingers 47 (see FIG. 5).

Figure 4:
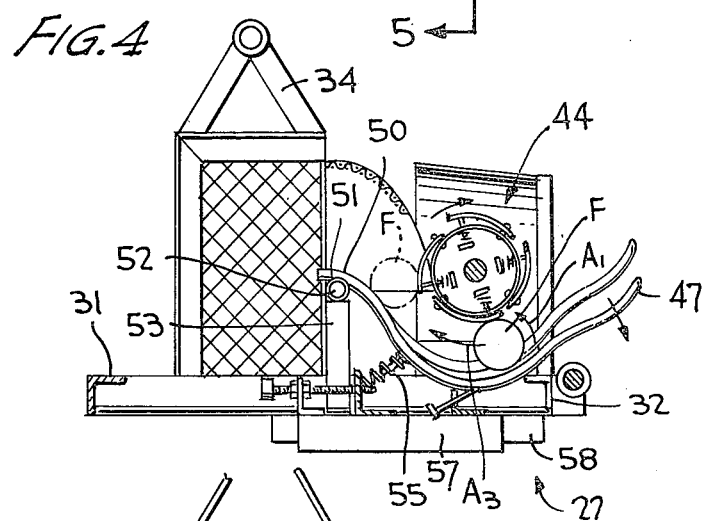
FIG. 4 is a side view of the fruit picker head illustrating the action of roll pressure member and finger cooperation as a piece of fruit is drawn through the channel of the picker head.

Each of the floating fingers 47 is provided with a rear section 50 that is freely seated in a notch 51 formed on cross support piece 52 mounted on uprights 53, as shown best in FIGS. 4 and 8. Without upward restriction, this rear section 50 is thus free to move up as a downward force is applied to the opposite (front) end of the finger 47. This gives the fingers an extra dimension of freedom designed to assure against bruising the fruit.

The fingers 47 curve forwardly from the rear 50 tangentially approaching substantially the same curvature as the outer driving periphery of the roll 44. At the throat of the channel C, substantially in the mid section of the fingers 47, these fingers 47 are maintained substantially on the same curvature as the driving surfaces. At the forwardmost points of the fingers, the fingers 47 extend outwardly again, substantially tangentially, so as to provide a wedge shaped opening (see FIG. 4) in which the fruit can be cradled as the picker head 25 is brought under it.

The fingers 47 are resiliently urged toward the roll 44 by springs 55 (see FIGS. 3 and 4), which springs 55 are gang mounted on an adjustable slide carriage 56 (see FIG. 8). The carriage 56 is mounted for sliding movement by side runners 57 mounted on tracks 58 attached to the side rails 30 (see FIG. 5).

It should be noted that the springs 55 are preferably permanently attached to the fingers, such as by welding (see FIG. 8). By utilizing a guide pin 59 obliquely extending from the underside of the finger 47, the springs 55 are maintained properly aligned under even compressive pressure.

The opposite end of the springs 55 are seated on an angle 60 that thus serves as a gang mounting. The springs are maintained under compressive force so that this end is held in position. A pair of spaced adjustment screws 61 (only one is illustrated) are seated against the movable angle 60 and threadedly engage the fixed angle 62 mounted on the guides 57 of the carriage 56. A lock nut 63 is provided to maintain the adjustment screw 61 in position once the adjusted position has been obtained.

A second angle 65 is also permanently attached to the guides 57 (see FIGS. 5 and 8). A plurality of slots 66 are provided for receiving guide rods 67 extending obliquely from the mid-section of the fingers 47. An adjusting nut 68 and lock nut 68' are provided on a threaded end of the guide rod 67 in order to provide the upper limit adjustment to the finger 47.

The entire carriage 56 and finger assembly shown in FIG. 8 is secured to the main framework by locking bolts threadedly engaging the guides 57 and adapted to be tightened against the tracks 58. By loosening the nuts 70; the desired position of the fingers 47 with respect to the roll 44 may be obtained by a simple sliding movement in either direction of arrow 71, as shown in FIG. 8. As will be seen, this adjustment aids in adjusting the size of the channels C of the picker head 25 for receiving different size fruit.

The construction of the segment wheels 45 of the picker roll 44 is also of importance to the present invention. In FIG. 6, a cross-sectional view shows the construction of the preferred embodiment comprising a disc 75 having an outer rim 76. The drive shaft 42 has an intermediate section 48 drivingly engaging each disk 75 by the flattened key areas 77 (see FIGS. 6 and 7). The tubular spacers 46 (see also FIG. 5) extending between the discs 75 are held in position by the outer rim 76 at one end (FIG. 6) and by spacer blocks 77 on the opposite end (FIG. 7). The roll 44 is easily constructed by merely interfitting the alternate segment wheels 45 and the spacers 46 on the shaft 48.

Figure 3:
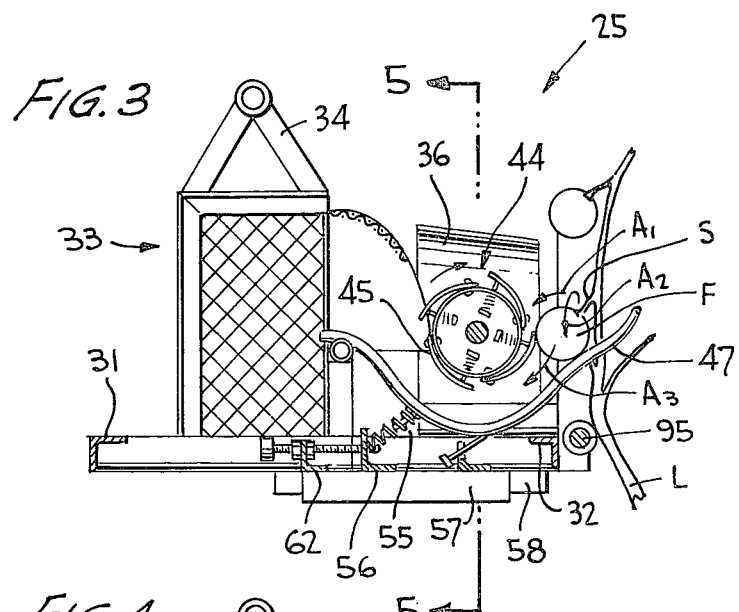
FIG. 3 is a sectional view on a reduced scale of the fruit picker head taken along the line 3—3 of FIG. 2 with a piece of fruit just engaging a pressure member of the picker roll.

The operative surface of the segment wheels 45 is formed by a plurality of arcuate pressure members 79 comprising an arcuate plate 80 pivotally attached to the flange 76 by a suitable fastener, such as rivet 81 in slightly enlarged aperture 82. Mounted on the plates 80 is a resilient surface layer 83 having transverse grooves 84 formed therein. The resilient surface may be rubber or the like and preferably is of a hardness substantially like that of an automobile tire casing. This particular hardness has been found to give the desired frictional contact surface to most efficiently drive the fruit, as it is engaged as shown in FIGS. 3 and 4. The grooves 84 provide spaced gripping edges that assure sufficient driving force to not only free the fruit F from the tree but to propel the fruit up and over the rear of the fingers 47 and into the cage 33 where they can drop through and into the transfer bag 20.

The arcuate pressure members are provided with additional resiliency through springs 90 that are attached to the free end by attachment pin 91 and limit collar 92. The one end of the spacer 46 has slots that fit over the collar 92 on the pins 91 (see FIG. 6). The base of the spring 90 is held in seat 93 supported on the side face of disk 75. The resiliency of the spring 90 is, of course, chosen to give the desired driving force while maintaining the gentle handling characteristic necessary for the nature of the fruit F being picked. This spring 90 does also have an indirect cooperation with the spring 55 since it is the summation of the two springs that determines the force across the fruit as the drive wheel picks and conveys the fruit.

The increased outer radial extent $r$ (FIG. 6) assures that the fruit F is engaged at the point shown in FIG. 3, thus extending the path of driving engagement. The inner radial extent $r_1$ provides an enlarged space immediately following (FIG. 3) where the fruit F is momentarily released from pressure from the pressure member at this position. The pressure is then quickly and progressively reapplied by the following pressure member. This provides a slight pulsing action that assists the critical clean picking action provided by the multiplanar rotation of the fruit that will be further described below. It can be realized that as the fruit F moves through the throat of the channels C (see FIG. 4) the trailing edge of the pressure member 79 bottoms out against the rim 76 so that under maximum pressure in the throat, substantially no variation occurs between two adjacent pressure members as the fruit F is driven therethrough. However, as the fruit F exits adjacent the rear 50 of the fingers 47, the spring action of the pressure members again comes into play and serves to propel the fruit (note dotted line fruit F1 in FIG. 4) with added impetus. This release of the stored energy in the spring 90 and flipping of the fruit rearwardly assures that the fruit F1 will continue to be conveyed through the cage 33 and into the transfer bag 26 as desired.

Figure 2:
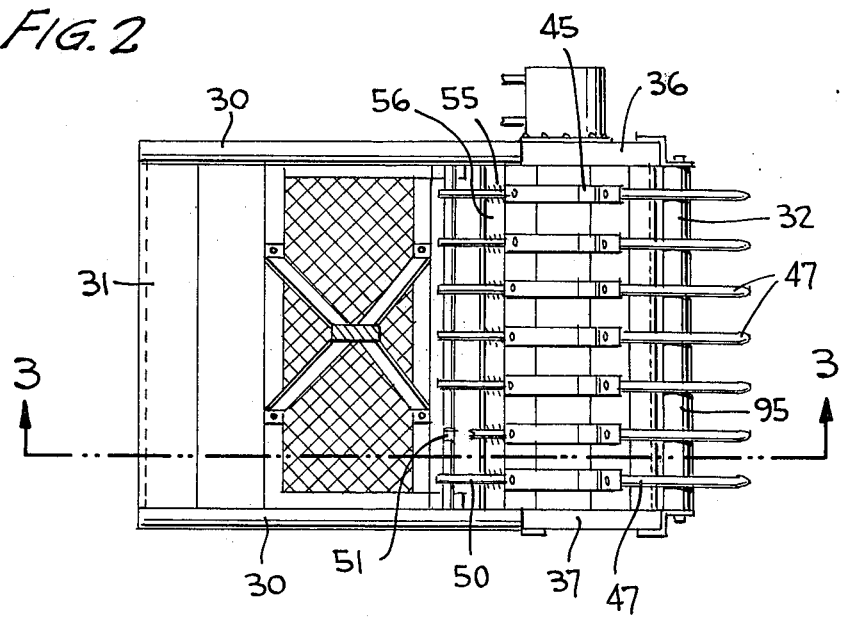
FIG. 2 is an enlarged view of the fruit picker head of the apparatus viewed from above along the line 2—2 of FIG. 1.

A fixed idler roller 95 is mounted below the fingers 47 at the forward end of the picker head 25. This roller serves an important function of guiding the fruit laden limbs L during the picking operation. As best shown in FIG. 2, the roller is mounted on the ends of the tubular side rails 30 and each end includes a suitable bearing to make the roller freely rotatable as the limb L engages the same.

The operation of the picker head 25 of the present invention can now be better understood and the important multiplanar rotation and pulling force may be illustrated in detail. To do this, reference is first made to FIG. 3 where the limb L is being worked on. The operator has moved the picker head 25 into position by use of the hydraulic actuators 15, 17, 19 on the apparatus 10, as shown in FIG. 1. He has moved the head up the limb and now has brought the fruit F into an initial position on top of finger 47 that exerts an initial pulling force. Momentarily, one of the outwardly biased pressure members 79 on the segment wheel 45 moves into engagement with the fruit opposite the finger. As soon as the two point contact across the fruit F is made between the pressure member 79 and the single finger 47, a counter-clockwise direction rotation, as noted by the arrow $A_1$ in FIG. 3, is initiated. This rotation starts a bending of stem S of the fruit and almost simultaneously, as the pressure on the fruit is increased by the compression of the springs 55, 90 (see also FIGS. 6 and 8), a rotational force $A_2$ about the cente or stem axis is set up. This occurs as the fruit tends to drop down into the channel C between two fingers 47 (see FIG. 5 also). When the fruit is settled in the channel C the four-point engagement is in effect and the pulling force $A_3$ is now fully in effect as the rearward conveying movement takes place along the fingers 47.

Since the head 25 has the several in-line wheels 45 and cooperating fingers 47, it is obvious that a feature of the invention is that several adjacent pieces of fruit may advantageously be picked at any particular moment. Also, when one fruit is being picked, the next fruit may be immediately accepted in the picker head since the rotation of the roll 44 is continuous.

The three multiplanar forces, represented by arrows A1, A2, A3, gently, but positively, snap the fruit from the stem S. The four-point driving engagement between two adjacent fingers and two adjacent segment wheels 45 distributes the forces to minimize chances of bruising the fruit. The fruit continues through the throat of the channel C, as shown in FIG. 4, with the rotational movement shown by arrow A1 and the bodily movement shown by arrow A3 continuing. The spring 90 has been fully compressed as the fruit enters the throat and spring 55 on the adjacent fingers 47 provides the resiliency to gently embrace the fruit and convey it toward the ejection point, shown by the dotted position in FIG. 4. The fingers 47 have a raised ridge pattern, designated by reference indicia X in FIG. 8, in order to provide a cooperative frictional surface for the fruit to engage. The fingers 47 are advantageously fabricated of standard concrete reinforcing bars, known as re-bars in the trade, and the ridged pattern X on these bars has been found to be ideal for the function desired. The ridges are smooth and yet do provide the necessary frictional surface required for positive driving action.

For the critical adjustment of the size of the channels C between the segment wheels 45 and the fingers 47, the operator may simply take the fruit F of the size to be picked and place it in the throat of the picker (FIG. 4 position). By hand, the operator tests the tension on the fingers 47 provided by the springs 55 (FIG. 4). The lock nut 63 is loosened and the adjusting screw 61 is adjusted to either compress or release the compression in the spring 55 as required (see FIG. 8). With experience, the operator can tell exactly the compressive force to be provided to insure proper movement of the fruit F through the channel C and at the same time maintain the fruit undamaged.

The upper limit of travel of the fingers 47 is regulated by the stop nut 68 on the guide rod 67. This adjustment is important to regulate the initial point of contact (FIG. 3) and the position of release (FIG. 4, dotted line position of fruit F). If a large fruit, such as grapefruit is being picked, the finger 47 is adjusted to the lower position by the nut 68 and the lock nut 68' holds this adjusted position. The compressive force of the spring 55 is normally adjusted first; however, it is to be understood that the two adjustments are made together to get just the right relationship for each particular size of fruit being picked. Again, the operator of the picking apparatus can soon learn the two simple adjustments required to give the gentle, but positive, picking action that characterizes the picker head 25 of the present invention.

The picker head 25 is made so as to be as service free as possible. However, the parts are made so that they may be easily disassembled, whenever the requirement for service does arise. For example, the tubular base members 38 for the side walls 36, 37 that mount the picker roll 44 and the drive motor 43 are held in position by the straps 97, as shown in FIGS. 1 and 5. The fasteners securing the straps to the side rails 30 are merely removed for service whereupon the entire roll 44 and its mounting structure can be removed as a unit. The carriage 56 can then be slid forward along the tracks 58 after loosening the lock bolts 70. Each finger is free to be removed separately by merely loosening the nuts 68, 68' (FIG. 8) on the rod 67 and lifting the finger since the rear 50 is only resting on the notch 51. The fingers can be released all at once by simply releasing the pressure of the adjustment screw 61 on the angle 60.

The transfer bag 27 has an enlarged cross section and length to store a batch of fruit at an intermediate point (in the bulge, see FIG. 1) as the picking process proceeds. The fruit is thus first dropped to the intermediate storage position in the bulge limiting the fall of the fruit to the container 21 to only about half what it would otherwise be. When the top of the tree is reached and the bag 26 is fully stretched out, the fruit will fall the rest of the way. Further, with the fruit in the intermediate position, it provides a cushioning action both as the individual fruit enters the batch as the batch is dumped into the container 21.

In summary, an improved picking assembly 11 is provided. The roll 44 with the wheels 45 in cooperation with the aligned fingers 47 is capable of providing multiplanar forces that efficiently snap the fruit from the stem. Tearing of the skin adjacent the stem and bruising is obviated. Ease of adjustment of the fingers 47 and good serviceability further characterize the structure. The idler roll 95 protects the limbs as the fruit is picked. Finally, the transfer bag 26 provides an extra dimension of efficiency to the overall picking operation.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A fruit picking apparatus for removing fruit from a tree comprising:
    a picker head;
    a frame on said picker head;
    a picker roll mounted for rotation on said frame, said roll including a plurality of segment wheels having outer fruit engaging surfaces;
    drive means on said head connected to said roll;
    a plurality of fruit engaging fingers on said frame spaced from said fruit engaging surfaces on said wheels, said fingers being in alignment with said wheels and curved to be substantially conforming therewith for cooperation to engage the fruit in channels formed therebetween; and
    resilient means on said head for relatively urging said fingers and said roll toward each other, whereby resilient engagement of the fruit and multiplanar rotation is provided for removing the fruit.

2. The apparatus of claim 1 wherein each of said segment wheels includes arcuate members forming said fruit engaging surfaces, one end of each of said members being pivotally mounted to said wheel and an opposite end of said segment being resiliently biased away from said wheel.

3. The apparatus of claim 1 including a housing connected to said frame, transfer means connected to said housing for transferring picked fruit from said housing to a receptacle in at least two steps and storing a batch of fruit at the intermediate point.

4. The apparatus of claim 1 including means for adjusting the distance between said fingers and said wheels to regulate the size of said channel.

5. The apparatus of claim 4 wherein said resilient means includes springs cooperating with each of said fingers, and said adjusting means includes a gang mounting support connected to said springs, and screw means connected to said frame for adjusting the position of said support to regulate the compression in said springs.

6. The apparatus of claim 1 wherein is further provided an idler roller affixed to the front of said frame to deflect the limbs during the picking operation.

7. The apparatus of claim 1 wherein said resilient means includes a spring on said frame attached to each finger, means on said frame for pivotally mounting said fingers, gang adjusting means connected to said springs, and guide means connected to each finger for controlling said finger during the pivotal movement.

8. The apparatus of claim 7 wherein said pivotal mounting means includes a support on said frame and a notch formed therein, one end of said finger freely engaging said notch.

9. The apparatus of claim 8 wherein is provided a carriage movably mounted on said frame for mounting said fingers, and means for locking said carriage in adjusted position to said frame.

10. The apparatus of claim 7 wherein said guide means includes a guide rod on each finger, and wherein is further provided means for adjusting said guide rod to limit the movement of said finger toward said roll to control the size of said channel.

* * * * *